July 10, 1956 M. E. DUNN 2,753,702
FLEXIBLE COUPLING
Filed Nov. 3, 1953
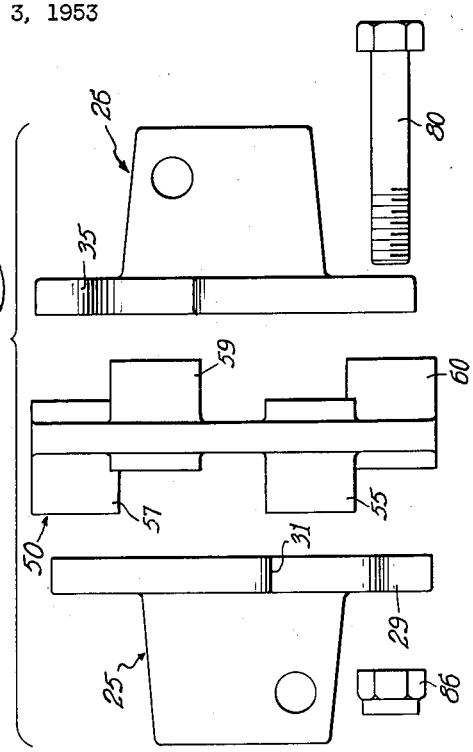
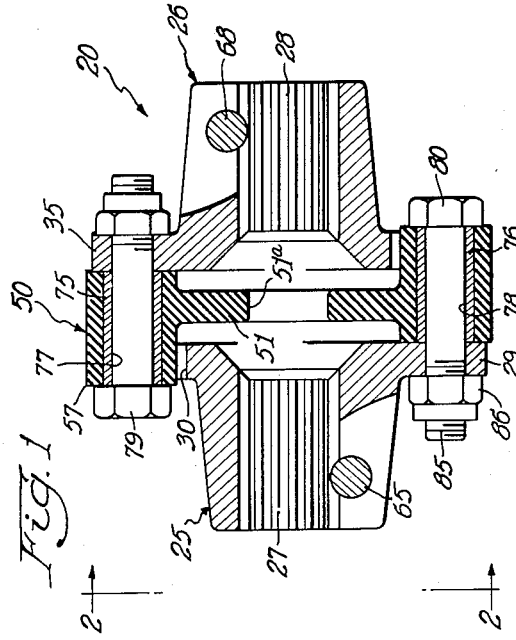
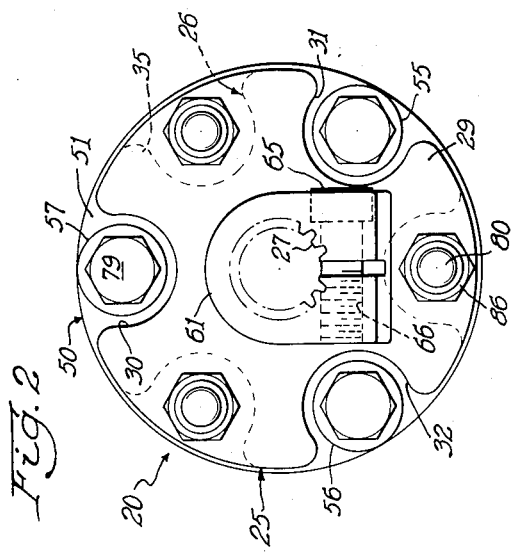
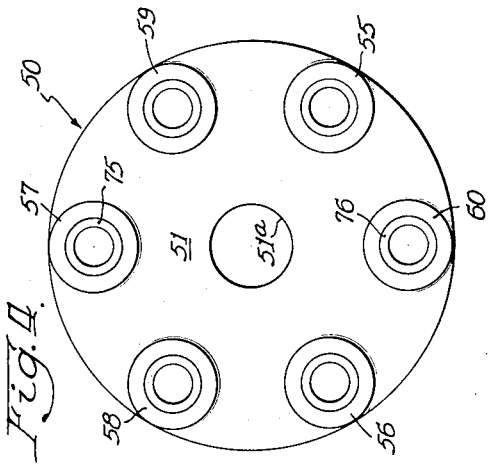
Inventor:
Michael E. Dunn
By: Joseph M. Gartner
Atty.

United States Patent Office 2,753,702
Patented July 10, 1956

2,753,702

FLEXIBLE COUPLING

Michael E. Dunn, Detroit, Mich., assignor to Morse Chain Company, Ithaca, N. Y., a corporation of New York Application November 3, 1953, Serial No. 389,913

4 Claims. (Cl. 64—13)

This invention relates, in general, to flexible couplings, and is particularly concerned with couplings of the type characterized as having incorporated therein a unitary molded center.

Otherwise stated, the invention is embodied in a flexible coupling having a unitary molded rubber center member providing relatively soft axial movement and yet will withstand relatively high operating deflection and angular or parallel misalignment to which the flexible coupling may be employed.

An important object and accomplishment of the invention is to provide a flexible coupling wherein torque is transmitted from one flange through the unitary center to the second flange under normal driving loads but also provides for deflection of portions of said unitary center member under extreme static torque so that portions thereof contact the flanges to provide a directly connected drive through such engaged portions and the flanges.

Another object and accomplishment of the invention is to provide a flexible coupling having incorporated therein a unitary molded coupling center member of flexible material, said flexible coupling having a highly desirable feature of easy and convenient assembly and replacement of said unitary center member while in operative position attached to two axially disposed shafts.

Another object and accomplishment is to provide a flexible coupling particularly adaptable to vehicle steering applications wherein it is desirable to have a relatively soft axial displacement and yet provide for substantial load carrying characteristics under static torque.

An ancillary object and accomplishment of the invention is to provide a new and improved flexible coupling which is adapted to be economically manufactured and which is so designed as to permit the manufacture and assembly thereof in accordance with present day large scale mass production methods of construction and assembly.

The invention seeks as a final object and accomplishment to provide a flexible coupling particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as more fully described herein, and as more particularly pointed out in the appended claims.

Embodiments of the invention are illustrated in the accompanying drawings forming a part hereof and wherein:

Fig. 1 is a sectional elevational view of a flexible coupling embodying the features of the present invention;

Fig. 2 is an end elevational view of the flexible coupling depicted in Fig. 1 and being taken substantially on the plane of the line 2—2 in Fig. 1;

Fig. 3 is an exploded side elevational view of the flexible coupling depicted in Fig. 1; and Fig. 4 is an elevational view of the unitary molded center member.

The drawings are to be understood to be more or less of a schematic character for the purpose of illustrating and disclosing a preferred form of the improvements contemplated herein, and in the drawings like reference characters identify the same parts in the several views.

In the exemplary embodiment of the invention depicted in Figs. 1, 2, 3 and 4, I have illustrated the flexible coupling with which the present invention is particularly concerned and designated in its entirety by the numeral 20. The flexible coupling 20 comprises, in general, a flanged member 25 and a flanged member 26 each being disposed in confronting relationship with respect to each other, and each such flanged member having means including splined apertures respectively indicated at 27 and 28 adaptable to secure the respective hubs to respective shafts (not shown).

As may best be seen in Fig. 2, the flange 29 of the flanged member 25 is provided with a plurality of recesses respectively indicated at 30, 31 and 32 equally spaced in an annular array and opening from the periphery of the flange 29. The flange 35 of the flanged member 26 is of similar construction and need not be further described here.

A unitary coupling center member designated in its entirety by the numeral 50 is operatively associated with the flanged member 25 and the flanged member 26 and is preferably molded of a flexible material such as, for example, rubber or the like and formed to define a web 51 and having three bosses 55, 56 and 57 projecting axially in one direction and bosses 58, 59 and 60 projecting axially in the opposite direction, and each of said bosses having a central through aperture adaptable to accommodate a stud bolt or the like to be hereinafter described. The web portion 51 of the unitary molded center member 50 may be provided with a central through aperture 51a as shown or may be molded solid.

The unitary molded coupling center member contemplated by this invention is characterized as being adaptable to carry equal tensile and comprehensive loadings in the web portion at either side of a respective boss, the force being applied at any boss by an associated stud bolt.

In accordance with the construction of the present invention, the flanged members 25 and 26 are of identical construction, and for this reason it is deemed sufficient to describe only one such flanged member in detail. In adverting to Figs. 1, 2 and 3, it may be seen that the flange member 25 is provided with a hub 61 having the centrally disposed splined through aperture 27 adjustable to receive a shaft (not shown).

In order to fixedly secure the flange member 25 to a shaft, I have provided a set screw 65 having threaded formations adaptable to be received into complementary threaded formations in an aperture 66 disposed in the hub 61, said set screw 65 being adaptable to draw the splined portions 27 into intimate contact with complementary splined portions disposed on an associated shaft (not shown), thereby to maintain the hub 25 in its operative position.

It can be seen that the flanged member 26 is also provided with a set screw 68 of the same general construction and function hereinbefore described with respect to the set screw 65, thereby to maintain the hub 26 in its normal operative position on a second shaft (not shown) normally axially aligned with respect to said first shaft (not shown).

Adverting to Figs. 1, 3 and 4, it can be seen that the coupling center 50 is formed to define a substantially circular shape and is provided with the web 51 and is molded so as to have integrally formed therewith the bosses 55, 56, 57, 58, 59 and 60, each of which is generally circular in shape. It is notable that the bosses 55, 56 and 57 project axially from the web 51 in one direction while the bosses 58, 59 and 60 project axially from the web 51 in the opposite direction.

Each of the bosses is provided with a central through aperture adapted to receive a metallic sleeve insert as at 75 and 76 (Fig. 1) and each of said sleeves is press fitted so that the periphery thereof is in intimate contact with an associated aperture in a boss in order to prevent relative movement therebetween. Moreover, each of said metallic sleeves as at 75 and 76 is respectively provided with central through apertures 77 and 78 in order to accommodate respectively stud bolts as at 79 and 80, there being a push fit between the periphery of the stud bolt and an associated aperture of a metallic sleeve. It is notable that the force applied at any boss by an associated stud bolt is carried by equal tensile and comprehensive loadings in the web portion at either side of the boss.

As may best be seen in Fig. 1, each of the stud bolts as at 79 and 80 project through a respective boss and has end portions 85 provided with threaded formations adapted to accommodate a nut as at 86 arranged for intimate engagement with adjacent portions of an associated flange of the flanged member 25 or 26 as the case may be.

An important feature of the invention is the provision of a flexible coupling which may be quickly and conveniently assembled in operative position to two shafts desired to be coupled together for operation in unison. This is admirably and advantageously accomplished in the present invention by providing a flexible coupling having only three main parts that may be easily separated one from the other, namely, the flanged member 25, the coupling center member 50 and the flanged member 26, all three of these parts being illustrated in their separated positions in Fig. 3. It can be seen that the complete flexible coupling assembly as contemplated herein may be assembled by causing the members hereinbefore described to assume their normal assembled position as illustrated in Fig. 1.

It is of particular interest that the molded coupling center 50 contemplated herein will effectively withstand a relatively high operating deflection and angular or parallel misalignment of the shafts to which the flexible coupling may be employed.

Moreover, the unitary molded rubber center section provides relatively soft axial displacement and yet will withstand relatively high operating deflection and angular or parallel misalignment to which the flexible coupling may be employed.

In vehicle steering applications, it is absolutely necessary to provide for protection against failures of the flexible coupling. In the present invention, this is admirably and advantageously accomplished by providing the flanged member 25 with recesses 30, 31 and 32 into which projecting portions of the respective bosses 55, 56 and 57 project and are normally free for relative movement responsive to angular or parallel misalignment of the shafts but which will engage said recesses respectively in the event that torque is applied of a magnitude greater than the capacity of said web portion of the center member thereby absolutely providing rotative movement of one of the shafts responsive to rotative force being applied by the other shaft. Similar recesses are provided in the flanged member 26 and into which the projecting portions of the bosses 58, 59 and 60 project for the same purpose.

Furthermore, it is a known fact that constant flexing of rubber will increase the life thereof. Accordingly, it can be seen that angular or parallel misalignment of the shafts will cause such flexing of the rubber as to increase its normal life span.

If it is found necessary to replace the unitary molded center 50 for any reason whatsoever, the flanged members 25 and 26 may be moved in opposed directions axially of the respective shafts after removing the respective nuts as at 86 from the stud bolts. The flange members 25 and 26 now assume the positions comparable to those shown in Fig. 3 and it can be seen that the coupling center 50 may be removed from the flexible coupling assembly and a replacement coupling member be substituted therefor. The flange members then may be moved axially toward each other to their respective normal positions as shown in Fig. 1, and the stud bolts replaced in their normal position as shown. With this construction and general arrangement of parts, it is possible and practical to repair the flexible coupling without necessitating the removal of the completely assembled coupling from the shafts, or without necessitating any disturbance to the shafts to which the flexible coupling is secured. This is important because of the economies afforded for repair and replacement of the flexible coupling when disposed in an automotive vehicle.

Because of its simple and symmetrical construction, the flexible coupling contemplated herein is economical to manufacture and is readily adaptable to mass production manufacturing methods.

From the foregoing disclosure, it may be observed that I have provided a flexible coupling which efficiently fulfills the objects as hereinbefore set forth and provides numerous advantages which may be summarized as follows:

1. Structurally simple, efficient and durable;
2. Economical to manufacture and readily adaptable to mass production manufacturing principles; and
3. The provision of a flexible coupling having incorporated therein a unitary molded rubber center section providing relatively soft axial movement and yet withstanding relatively high operating deflection and angular or parallel misalignment to which the flexible coupling may be employed.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A flexible coupling for shafts comprising, two flanged members disposed in confronting relationship with respect to each other and each such flanged member having means adaptable to secure it to a respective shaft, each of said flanged members having means including a plurality of equally spaced recesses opening from the periphery of said flanged members, a unitary coupling center member operatively disposed between said flanged members and molded of a flexible material to define a web of constant thickness having circumferentially spaced bosses integrally molded therewith, said bosses projecting axially on opposite sides of said web in alternating fashion and each having a central through aperture, means including stud bolts received respectively into said through apertures for interconnecting said center member to said flanged members, portions of said axially projecting bosses being arranged to project within the confines of said recesses and being normally disposed in spaced relationship therewith, and said portions being arranged to engage adjacent portions of said recesses responsive to application of torque of a magnitude greater than the normal load.

2. A flexible coupling for shafts comprising, flanged members disposed in confronting relationship with respect to each other, means including a plurality of equally spaced recesses opening from the periphery of said flanged members, a unitary coupling center member operatively disposed between said flanged members and molded of a flexible material to define a web having circumferentially spaced bosses integrally molded therewith, said bosses projecting axially on opposite sides of said web in alternating fashion, means including stud bolts interconnecting said center member to said flanged members, portions of said axially projecting bosses being arranged to project within the confines of said recesses and being normally disposed in spaced relationship therewith, and said portions being arranged to engage adjacent portions of said recesses responsive to application of torque of a magnitude greater than the normal load.

3. A flexible coupling for shafts comprising, flanged members disposed in confronting relationship with respect to each other, each of said flanged members having means including a plurality of equally spaced recesses opening from the periphery of said flanged members, and a unitary molded flexible coupling center member operatively disposed between said flanged members and having axially projecting bosses arranged to extend from opposite sides of said center member in alternating fashion so as to project within the confines of said recesses and being normally disposed in spaced relationship therewith, and said bosses being arranged to engage adjacent portions of said recesses responsive to application of torque of a magnitude greater than the normal load.

4. For a flexible coupling having flanged members disposed in confronting relationship with respect to each other, and each of said flanged members having means including a plurality of equally spaced recesses opening from the periphery of said flanged members, a unitary coupling center member operatively disposed between said flanged members and molded of a flexible material to define a web having axially projecting bosses integrally formed therewith, said bosses extending from opposite sides of said web in alternating fashion, means including stud bolts interconnecting said center member to said flanged members, portions of said axially projecting bosses being arranged to project within the confines of said recesses and being normally disposed in spaced relationship therewith, and said portions being arranged to engage adjacent portions of said recesses responsive to application of torque of a magnitude greater than the normal load.

References Cited in the file of this patent

UNITED STATES PATENTS

| | | |
|---|---|---|
| 1,691,116 | Jencick | Nov. 13, 1928 |
| 2,659,218 | Riopelle | Nov. 17, 1953 |